United States Patent [19]

Hogan et al.

[11] 4,141,852
[45] Feb. 27, 1979

[54] METHOD OF STABILIZING A MIXTURE OF LOW AND HIGH MOLECULAR WEIGHT POLYETHERS

[75] Inventors: James M. Hogan, Tallmadge; John R. White, Wadsworth, both of Ohio

[73] Assignee: The Goodyear Tire & Rubber Company, Akron, Ohio

[21] Appl. No.: 824,366

[22] Filed: Aug. 15, 1977

[51] Int. Cl.$^2$ .............................................. C08K 5/20
[52] U.S. Cl. ............................... 252/182; 260/33.2 R; 260/823
[58] Field of Search ................ 252/182; 260/77.5 AP, 260/33.2 R

[56] References Cited

U.S. PATENT DOCUMENTS

| | | | |
|---|---|---|---|
| 3,652,639 | 3/1972 | Pizzini et al. | 260/859 |
| 3,933,938 | 1/1976 | Rhodes et al. | 260/77.5 AP |
| 3,993,576 | 11/1976 | Barron | 260/77.5 AP |

*Primary Examiner*—Benjamin R. Padgett
*Assistant Examiner*—Deborah L. Kyle
*Attorney, Agent, or Firm*—J. D. Wolfe

[57] ABSTRACT

A mixture of low and high molecular weight polyether polyols are stabilized by including in the mixture one to 10 percent by weight of a grafted polypropylene ether polyol of 2-4 hydroxyls having a molecular weight of 1500 to 3500 where the graft monomer is acrylonitrile or acrylonitrile styrene.

4 Claims, No Drawings

METHOD OF STABILIZING A MIXTURE OF LOW AND HIGH MOLECULAR WEIGHT POLYETHERS

This invention relates to a method of producing blends of monomeric and polymeric polyols that do not separate on standing without agitation for several days.

When monomeric and polymeric polyols are mixed, experience with separation of the two different polyols due to the much higher gravity of the monomeric polyols occurs quite readily and consequently production difficulties are experienced because of this separation and the ratios of monomeric and polymeric polyols is not precisely controlled as is needed in the manufacture of polyurethanes.

We have discovered this difficulty can be alleviated by blending in a grafted polypropylene ether polyol that makes the monomeric and polymeric polyols more soluble or compatible with each other and thus reduces the tendency of the monomeric and polymeric polyols to separate from each other. The nature of this invention can be more readily appreciated by reference to the following discussion.

The polypropylene ether glycol, triol and blends of said glycol and triol of 1800 to 7000 molecular weight are used as the resin reactant in making polyurethane prepolymers or one-shot reaction mixtures. Usually the polypropylene ether polyols of 2000 to 6500 molecular weight are used. A mol of this polyol for an excess amount of an organic polyisocyanate is used. The excess organic polyisocyanate is reacted with a curative amount of a curative, i.e. generally 50 to 95 percent based on excess isocyanate. Where one-shot systems are to be utilized, blends of the polypropylene ether polyol and the monomeric polyols of less than 500 molecular weight are made by blending the appropriate ingredients. Generally, this is a mol of polypropylene ether polyol and 0.5 to 0.95 mols of monomeric polyol.

A curative amount of a monomeric diol such as diethanol carbamate or sometimes known as β-hydroxyethyl, β-hydroxyethyl carbamate was blended in the above polyol mixture and allowed to stand. To emphasize the degree of separation, a green food coloring that is soluble in both the monomeric and polymeric diol is blended in the mixture with the green food coloring being more soluble in the monomeric polyol. It was noted that on standing overnight the control sample consisting of the polypropylene ether glycol and the diethanol carbamate showed a significant increase in the darkening of the green color in the lower layer due to the separation of the diethanol carbamate from the polymeric polyol. On the other hand, where as little as one percent to as much as ten percent by weight of the grafted acrylonitrile polyether polyol was present, only slight darkening, if any, was exhibited on the mixture standing for three days.

The grafted polypropylene ether glycol or triol useful in this invention has a molecular weight between 1500 and 3500 and contains 4 to 30 percent and preferably 4 to 20 percent by weight of a grafting monomer selected from the group consisting of acrylonitrile or acrylonitrile and no more than 10 percent styrene. Grafted polymers are well known and available under the trade name Niax 31-28 TM.

Similar results were obtained when other glycols such as ethylene glycol or 1,4-butanediol were used to replace the diethanol carbamate.

While certain representative embodiments and details have been shown for the purpose of illustrating the invention, it will be apparent to those skilled in this art that various changes and modifications may be made therein without departing from the spirit or scope of the invention.

What is claimed is:

1. A method of stabilizing a mixture of a monomeric polyol of less than 500 molecular weight and a polyether polyol of 1800 to 7000 molecular weight against gravity separation, comprising adding one to ten percent by weight of grafted polypropylene ether polyol of two to four hydroxyls of 1500 to 3500 molecular weight to said mixture, said grafted polypropylene ether polyol containing less than 30 percent by weight of a grafting monomer of acrylonitrile or acrylonitrile and styrene.

2. The method of claim 1 wherein the monomeric polyol is diethanol carbamate.

3. The method of claim 1 wherein the mixture contains a mol of polyether polyol and 0.5 to 0.95 mols of the monomeric polyol.

4. The method of claim 3 wherein the polyols are polypropylene ether polyol and diethanol carbamate.

* * * * *